(12) United States Patent
Taka

(10) Patent No.: US 7,116,903 B2
(45) Date of Patent: *Oct. 3, 2006

(54) CAMERA WITH AUTOMATIC FOCUSING DEVICE

(75) Inventor: Hideo Taka, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,997

(22) Filed: Aug. 10, 2005

(65) Prior Publication Data

US 2006/0029380 A1    Feb. 9, 2006

Related U.S. Application Data

(63) Continuation of application No. 10/974,631, filed on Oct. 27, 2004, now Pat. No. 7,003,224, which is a continuation of application No. 10/728,112, filed on Dec. 4, 2003, now Pat. No. 6,826,363.

(30) Foreign Application Priority Data

Dec. 6, 2002    (JP) ............................. 2002-355297

(51) Int. Cl.
*G03B 13/36*    (2006.01)
(52) U.S. Cl. ................................... 396/125

(58) Field of Classification Search ................. 396/89, 396/104, 125–128
See application file for complete search history.

(56) References Cited

U.S. PATENT DOCUMENTS

| | | | |
|---|---|---|---|
| 4,592,638 A | 6/1986 | Kaneda et al. |
| 5,457,512 A | 10/1995 | Kondo |
| 5,597,999 A | 1/1997 | Kinba et al. |
| 5,815,748 A | 9/1998 | Hamamura et al. |
| 6,763,187 B1 | 7/2004 | Shiraishi |
| 6,826,363 B1 | 11/2004 | Taka |
| 2003/0189662 A1 | 10/2003 | Matsuda |

*Primary Examiner*—W. B. Perkey
(74) *Attorney, Agent, or Firm*—Rossi, Kimms & McDowell, LLP

(57) ABSTRACT

An automatic focusing device for camera is provided which makes it possible to sequentially photograph a large number of frames while ensuring a high focusing accuracy. A first focusing unit carries out a first focusing operation. After the first focusing unit carries out the first focusing operation, a second focusing unit carries out a second focusing operation. A storage device stores a difference in results obtained by the first and second focusing operations. In sequential shooting, a controller causes the first focusing unit to correct the result of the first focusing operation according to the stored difference, and inhibits the second focusing unit from carrying out the second focusing operation.

3 Claims, 3 Drawing Sheets

CAMERA WITH AUTOMATIC FOCUSING DEVICE

CROSS-REFERENCE

This is a continuation of application Ser. No. 10/974,631, filed Oct. 27, 2004, now U.S. Pat. No. 7,003,224 which is a continuation of application Ser. No. 10/728,112, filed Dec. 4, 2003, which is now U.S. Pat. No. 6,826,363.

BACKGROUND OF THE INVENTION

1. Field of the Invention

The present invention relates to an automatic focusing device for a camera and a method of controlling the same, and more particularly to an automatic focusing device for an electronic single lens reflex camera with an interchangeable lens, which is provided with an automatic focusing means of a phase difference detecting type and an automatic focusing means of a contrast detecting type, and a method of controlling the same.

2. Description of the Related Art

Conventionally, as an automatic focusing device for electronic single lens reflex cameras with an interchangeable lens, an automatic focusing device of the phase difference detecting type has been widely used. The automatic focusing device of this type carries out focusing of a lens for focusing a taking lens by a defocus detecting mechanism, which is provided in the main body of the camera to perform automatic focusing adjustment, as well as motors provided inside the lens or the camera.

Also, an automatic focusing device of a contrast detecting type which detects a contrast according to high-frequency components of a signal from an image pickup device, and an automatic focusing device which is a combination of the automatic focusing device of the phase difference detecting type and the automatic focusing device of the contrast detecting type have been proposed.

The automatic focusing device of the phase difference detecting type is capable of finding a defocusing direction and a defocusing amount by detecting a focus only once, and hence only a short period of time is required for automatic focusing, and a release time lag is short, which is an important factor for the electronic single lens reflex camera with an interchangeable lens.

On the other hand, the automatic focusing device of the contrast detecting type has the advantage that a high focusing accuracy can be ensured by detecting a focus according to a signal from the image pickup device itself.

However, the automatic focusing device of the phase difference detecting type is constructed such that a focus detecting sensor is provided independently of the image pickup device, which may cause a difference between a focus detected by the focus detecting sensor and a focus detected by the image pickup device due to manufacturing errors, environmental change, secular change, etc. of parts including interchangeable lenses. To ensure a high focusing accuracy which is of great importance to the electronic single lens reflex camera with an interchangeable lens, the camera needs to be large-sized and a very high cost is required. The automatic focusing device of the contrast detecting type has the problem that the release time lag is long since a focus is found by repeating a cycle in which the focus adjusting lens and other parts are moved to detect a focus.

In the case where an automatic focusing device which is a combination of the automatic focusing device of the phase difference detecting type and the automatic focusing device of the contrast detecting type is used, an error caused by manufacturing errors, environmental change, aging change, or the like of parts including interchangeable lenses can be corrected after the focus adjusting lens is quickly moved to a point in the vicinity of a focus, but the number of frames which can be taken per second in sequential shooting (hereinafter referred to as "the number of frames to be taken in sequential shooting") cannot be increased since two-stage automatic focusing adjustment is required.

SUMMARY OF THE INVENTION

It is an object of the present invention to provide an automatic focusing device for a camera, which can increase the number of frames to be taken in sequential shooting while ensuring a high focusing accuracy.

To attain the above object, in a first aspect of the present invention, there is provided an automatic focusing device for a camera, comprising a first focusing unit that carries out a first focusing operation, a second focusing unit that carries out a second focusing operation after the first focusing unit executes the first focusing operation, a storage device that stores a difference between a result of the first focusing operation carried out by the first focusing unit and a result of the second focusing operation carried out by the second focusing unit, and a controller operable in sequential shooting, for providing control to cause the first focusing unit to correct the result of the first focusing operation according to the difference stored in said storage device, and to inhibit the second focusing unit from carrying out the second focusing operation.

According to the first aspect of the present invention, a difference between the result of the first focusing operation carried out by the first focusing unit and the result of the second focusing operation carried out by the second focusing unit is stored, and in sequential shooting, the result of the first focusing operation carried out by the first focusing unit is corrected according to the stored difference while the second focusing unit is inhibited from carrying out the second focusing operation. As a result, it is possible to increase the number of frames to be taken in sequential shooting while ensuring a high focusing accuracy for the second and subsequent frames.

Preferably, the first focusing unit is a phase difference detecting type, and the second focusing unit is a contrast detecting type.

To attain the above object, in a second aspect of the present invention, there is provided a method of controlling an automatic focusing device for a camera, including a first focusing unit that carries out a first focusing operation, and a second focusing unit that carries out a second focusing operation after the first focusing unit carries out the first focusing operation, comprising a storage step of storing a difference between a result of the first focusing operation carried out by the first focusing unit and a result of the second focusing operation carried out by the second focusing unit, and a control step of providing control in sequential shooting to cause the first focusing unit to correct the result of the first focusing operation according to the difference stored in the storage step, and to inhibit the second focusing unit from carrying out the second focusing operation.

According to the second aspect of the present invention, the same effects as in the first aspect can be obtained.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
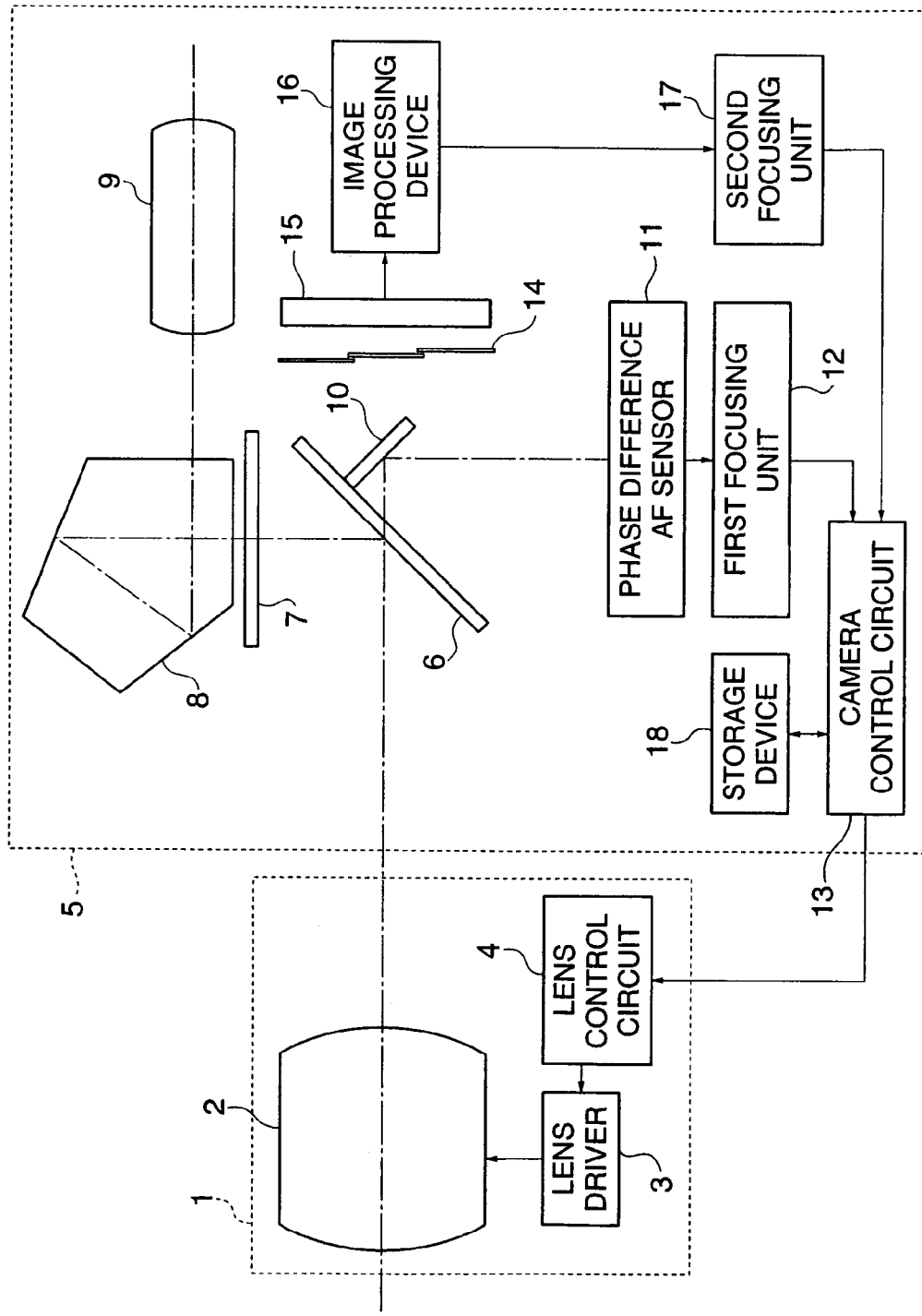
FIG. 1 is a block diagram schematically showing the construction of an electronic camera including an automatic focusing device according to an embodiment of the present invention, in which the camera lies in an observation-through-viewfinder position.

FIG. 1 is a block diagram schematically showing the construction of an electronic camera including an automatic focusing device according to an embodiment of the present invention, in which the camera lies in an observation-through-viewfinder position.

The electronic camera according to the present embodiment is implemented by a digital still single lens reflex camera with an interchangeable lens which employs a large-sized solid-state image pickup device to pick up an image by primary image formation. The electronic camera according to the present embodiment uses a taking lens which is originally intended for an automatic focusing single lens reflex camera using silver halide film.

Figure 2:
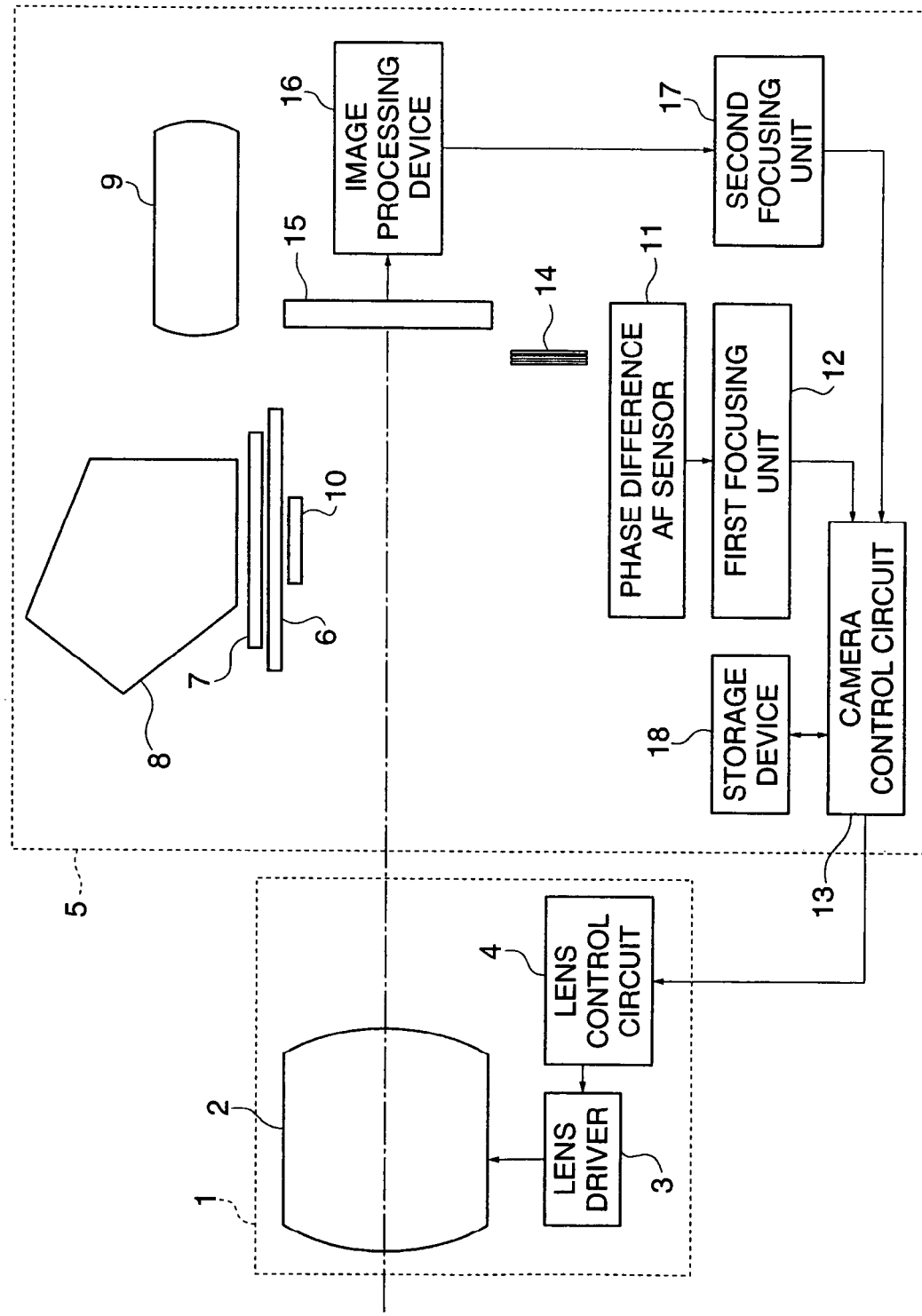
FIG. 2 is a block diagram schematically showing the construction of the electronic camera in FIG. 1, in which the camera lies in an exposure position.

As shown in FIG. 1, the electronic camera is comprised of a camera main body 5, described later, and a taking lens 1 which is removably (exchangeably) mounted on the camera main body 5. FIG. 1 shows a state in which the electronic camera lies in an observation-through-viewfinder position, and FIG. 2 shows a state in which the electronic camera lies in an exposure position.

The taking lens 1 is comprised of an image pickup optical system 2 including a focus adjusting lens, a lens driver 3 which drives the focus adjusting lens to adjust the focus of the image pickup optical system 2, and a lens control circuit 4 which controls the lens driver 3.

The camera main body 5 has a half mirror provided at a central part thereof, that is, it has mainly provided therein a first mirror 6 which reflects part of object image light sensed by the image pickup optical system 2 and transmits the remaining part of the object image light; a viewfinder screen 7 having a lower surface thereof formed as a diffusing surface for forming an object image from the object image light guided by the first mirror 6 and an upper surface thereof formed as a Fresnel lens for collecting the formed object image; a pentagonal prism 8 which reflects the object image collected by the upper surface of the viewfinder screen 7; a viewfinder 9 through which the object image reflected from the pentagonal prism 8 is observed as a viewfinder image; and a second mirror which reflects the object image transmitted through the first mirror 6.

Further, the camera main body 5 has provided therein a focal plane shutter 14 which is disposed behind the second mirror 10, for intercepting a bundle of formed object image light; a solid-state image pickup device 15 such as a CCD (Charge Coupled Device) or a CMOS (Complementary Metal-Oxide Semiconductor), which is provided behind the focal plane shutter 14, for forming the object image from the object image light from the taking lens 2; and a release switch, not shown. The release switch is comprised of a first stroke switch SW1 and a second stroke switch SW2, and takes a first stroke position corresponding to a half stroke (the first stroke switch SW1: ON) and a second stroke position corresponding to a full stroke (the second stroke switch SW2: ON). The electronic camera carries out a focusing operation when the release switch lies in the first stroke position, and carries out a shutter releasing operation when the release switch lies in the second stroke position.

The first mirror 6, second mirror 10, and focal plane shutter 14 are spread out as shown in FIG. 1 when the electronic camera lies in the observation-through-viewfinder position, and are in a mirror-up state or a retracted state as shown in FIG. 2 when the electronic camera lies in the exposure position.

Further, as shown in FIG. 1, the camera main body 5 has provided therein an AF sensor 11 of a phase difference detecting type which detects the object image transmitted through the first mirror 6 and reflected on the second mirror 10, a first focusing unit 12 which calculates a deviation in focus from a signal output from the AF sensor 11, and a camera control circuit 13 that receives the deviation in focus calculated by the first focusing unit 12 and transmits the same to the lens control circuit 4.

The lens control circuit 4 causes the lens driver 3 to drive the focus adjusting lens of the image pickup optical system 2 according to the deviation in focus calculated by the first focusing unit 12, thereby causing the image pickup optical system 2 to carry out focusing.

A focusing operation is quickly carried out in response to the output from the AF sensor 11 of the phase difference detecting type, that is, according to a defocusing direction and a defocusing amount of the image pickup optical system 2. The focusing operation, however, contains a focusing error caused by manufacturing errors, environmental change, aging change, etc. of the taking lens 1 and other related parts.

Further, as shown in FIG. 2, the camera main body 5 further has provided therein an image processing device 16 which performs processing on an output signal from the solid-state image pickup device 15, which forms an object image from the object image light from the image pickup optical system 2, to extract image contrast information, and carries out white-balance adjustment, γ-correction, color-matrix adjustment, and so forth to form a photographic image; a second focusing unit 17 which calculates a deviation in focus according to the image contrast information obtained from the image processing device 16; and a storage device 18 which stores a difference in the result of focusing by the first focusing unit 12 and the result of focusing by the second focusing unit 17.

The camera control circuit 13 has not only the above described function but also a function of receiving the deviation in focus calculated by the second focusing unit 17 and transmitting the same to the lens control circuit 4. More specifically, the lens control circuit 4 causes the lens driver 3 to drive the focus adjusting lens of the image pickup optical system 2 according to the deviation in focus calculated by the second focusing unit 17, thereby causing the image pickup optical system 2 to carry out focusing.

Figure 3:
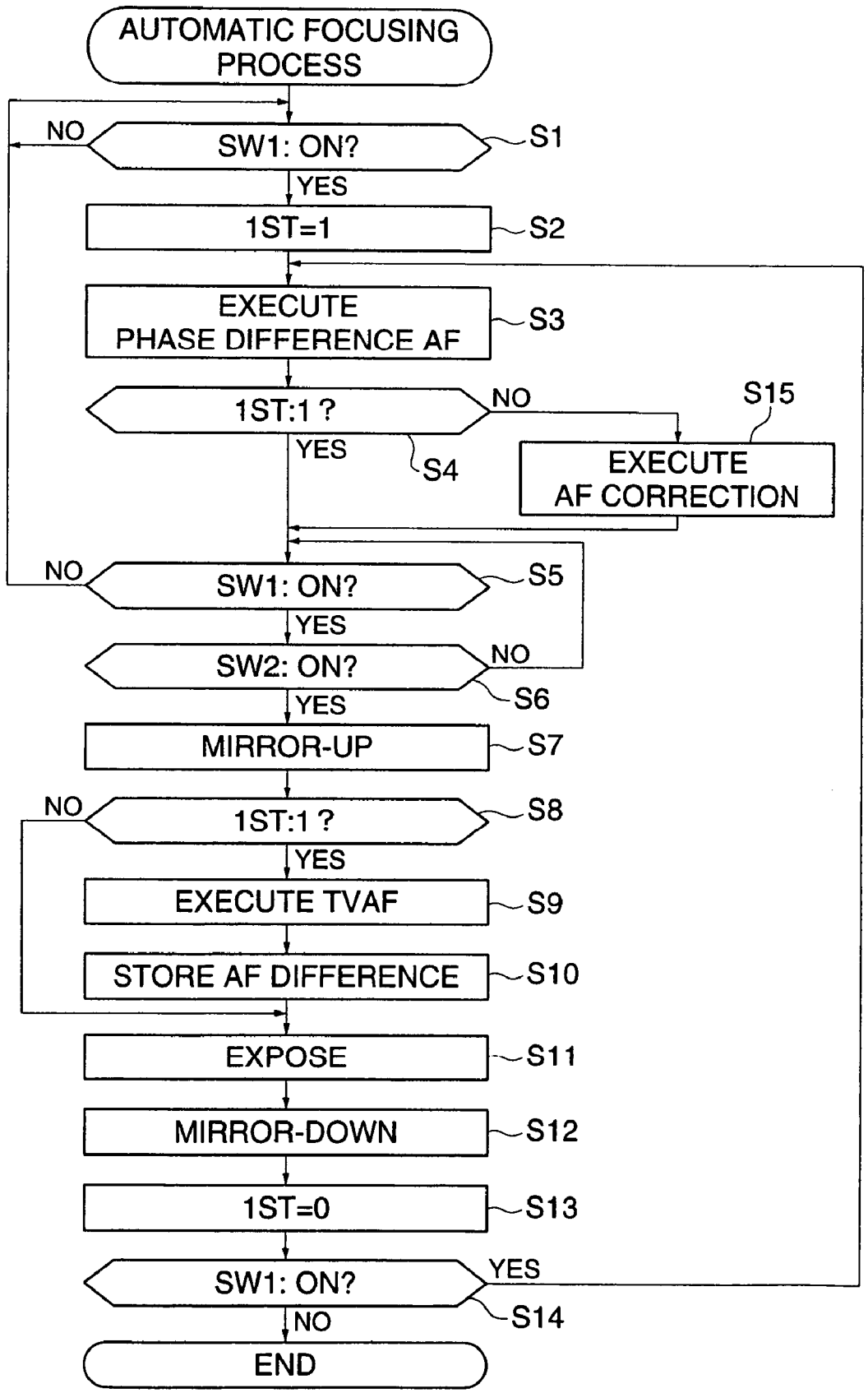
FIG. 3 is a flow chart showing an automatic focusing process carried out by the automatic focusing device of the electronic camera in FIG. 1.

FIG. 3 is a flow chart showing an automatic focusing process carried out by the automatic focusing device of the electronic camera appearing in FIG. 1.

First, when the release switch lies in the first stroke position with the first stroke switch SW1 on ("YES" to a step S1), the camera control circuit 13 sets a flag 1ST to "1" to indicate that the release switch lies in the first stroke position (step S2), and then executes phase difference automatic focusing (phase difference AF) (step S3). More specifically, in the step S3, the first focusing unit 12 calculates a deviation in focus from an output signal from the phase difference AF sensor 11, and the camera control circuit 13 causes the lens control circuit 4 of the taking lens 1 to move the focus adjusting lens of the image pickup optical system 2 according to the calculated deviation, causing the image pickup optical system 2 to reach a focus position set by the phase difference AF (step S3).

Then, the camera control circuit 13 determines whether the flag 1ST is set to "1" or not (step S4). The camera control circuit 13 then determines whether the release switch is kept in the first stroke position or not (step S5).

If it is determined in the step S5 that the release switch is not in the first stroke position ("NO" to the step S5), the step S1 and subsequent steps are executed again, and on the other hand, if it is determined in the step S5 that the release switch is kept in the first stroke position ("YES" to the step S5), it is then determined whether or not the release switch lies in the second stroke position with the second stroke switch SW2 on (step S6).

If it is determined in the step S6 that the release switch does not lie in the second stroke position, the step S5 and subsequent steps are executed again, and on the other hand, if it is determined in the step S6 that the release switch lies in the second stroke position ("YES" to the step S6), the camera control circuit 13 carries out a mirror-up operation for retracting the first mirror 6, the second mirror 10, and the focal plane shutter 14 to respective shooting positions (shown in FIG. 2) so as to start a shooting sequence (step S7).

Then, the camera control circuit 13 determines whether the flag 1ST is set to "1" or not (step S8). The flag 1ST is set to "1" at first, and hence contrast detecting automatic focusing (TVAF) is executed (step S9). In the TVAF in the step S9, the image processing device 16 reads out, at a high speed, an image corresponding to a position, at which a signal from the AF sensor 11 is taken out (angle-of-view position), from the solid-state image pickup device 15 to obtain image contrast information. Then, the second focusing unit 17 calculates a deviation in focus based on the image contrast information, and the camera control circuit 13 causes the lens control circuit 4 to move the focus adjusting lens of the image pickup optical system 2 according to the calculated deviation in focus, so that the image pickup optical system 2 reaches a focus position set by the TVAF.

At a time point the image pickup optical system 2 reaches the focus position relative to the solid-state image pickup device 15 after the completion of the TVAF in the step S9, a difference between the focus position (the result of focusing) set by the phase difference AF and the focus position (the result of focusing) set by the TVAF is stored in the storage device 18 (step S10).

Then, exposure is performed by closing down an aperture, not shown, of the taking lens 1 to a set aperture value, driving the solid-state image pickup device 15 in a normal way, and controlling an exposure time using an electronic shutter (step S11). On this occasion, the image processing device 16 carries out white-balance adjustment, γ-correction, color-matrix adjustment, and so forth to form a photographic image.

Further, the focal plane shutter 14 is closed to be returned to the state of intercepting a bundle of light, the aperture of the taking lens 1 is opened up, and the first mirror 6 and the second mirror 10 are returned to the observation-through-viewfinder position (step S12)

Then, the flag 1ST is reset to "0" (step S13), and the photographic image formed in the step S11 is stored in e.g. a nonvolatile memory.

It is then determined in a step S14 whether or not the release switch is kept in the first stroke position after the photographic image is recorded (step S14). If it is determined that the release switch has returned from the first stroke position to the original position, the process is terminated, and on the other hand, if it is determined that the release switch is kept in the first stroke position ("YES" to the step S14), the step S3 and subsequent steps are executed again to carry out sequential shooting.

If the sequential shooting is carried out in the step S3 and subsequent steps ("YES" to the step S14), the flag 1ST is reset to "0" (step S13), and therefore, after the phase difference AF is executed (step S3), the process proceeds to a step S15 according to the result of the determination in the step S4. In the step S15, the image pickup optical system 2 is moved to execute AF correction so as to correct the difference between the focus position set by the phase difference AF and the focus position set by the TVAF, which is stored in the step S10. Further, according to the result of the determination in the step S8, the process proceeds to the step S11 to perform exposure, while skipping the steps S9 and S10 to omit the TVAF.

According to the automatic focusing process described above with reference to FIG. 3, a difference between the focus position set by the phase difference AF and the focus position set by the TVAF is stored, and in sequential shooting, the focus position set by the phase difference AF is corrected based on the stored difference without executing the TVAF. Therefore, it is possible to increase the number of frames to be taken in sequential shooting while ensuring a high focusing accuracy for the second and subsequent frames.

Although in the above described embodiment, the AF correction for sequential shooting is executed after execution of the phase difference AF, it is more preferable that the taking lens 1 is driven by an amount including an AF correction amount when the phase difference AF is executed in sequential shooting so that the total period of time for which the taking lens 1 is driven can be reduced.

What is claimed is:

1. A camera comprising:
   a first focusing unit that carries out a first focusing operation based on a phase difference between two images;
   a second focusing unit that carries out a second focusing operation based on contrast of an image; and
   a shooting unit that carries out one shooting by causing said second focusing unit to carry out the second focusing operation after said first focusing unit carries out the first focusing operation and a sequential shooting without causing said second focusing unit to carry out the second focusing operation after said first focusing unit carries out the first focusing operation.

2. A camera as claimed in claim 1, further comprising:
   a storage device that stores a difference between a result of the first focusing operation carried out by said first focusing unit and a result of the second focusing operation carried out by said second focusing unit.

3. A camera as claimed in claim 2, wherein said shooting unit carries out the sequential shooting by causing said first focusing unit to correct the result of the first focusing operation according to the difference stored in said storage device, and inhibiting said second focusing unit from carrying out the second focusing operation.

* * * * *